(12) United States Patent
Montgomery

(10) Patent No.: US 12,475,311 B2
(45) Date of Patent: *Nov. 18, 2025

(54) INTERACTIVE WRITING PLATFORM

(71) Applicant: Outline It, Inc., Princeton, NJ (US)

(72) Inventor: Sydney Alexandra Montgomery, Princeton, NJ (US)

(73) Assignee: Outline It, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,193

(22) Filed: Apr. 24, 2024

(65) Prior Publication Data

US 2024/0281605 A1    Aug. 22, 2024

Related U.S. Application Data

(63) Continuation of application No. 18/196,360, filed on May 11, 2023, now Pat. No. 11,995,399.

(60) Provisional application No. 63/340,560, filed on May 11, 2022.

(51) Int. Cl.
    *G06F 40/247*    (2020.01)
    *G06F 40/106*    (2020.01)
    *G06F 40/166*    (2020.01)
    *G06F 40/30*    (2020.01)

(52) U.S. Cl.
CPC .......... *G06F 40/247* (2020.01); *G06F 40/106* (2020.01); *G06F 40/166* (2020.01); *G06F 40/30* (2020.01)

(58) Field of Classification Search
CPC .... G06F 40/247; G06F 40/166; G06F 40/106; G06F 40/30

USPC .......................................................... 715/256
See application file for complete search history.

(56) References Cited

U.S. PATENT DOCUMENTS

| | | | |
|---|---|---|---|
| 5,444,615 A | 8/1995 | Bennett et al. | |
| 11,526,655 B2* | 12/2022 | Corwin | G06F 40/166 |
| 11,568,148 B1* | 1/2023 | Nichols | G06F 40/237 |
| 11,995,399 B2* | 5/2024 | Montgomery | G06F 40/166 |
| 2008/0235576 A1 | 9/2008 | Bringsjord et al. | |
| 2011/0191368 A1* | 8/2011 | Muzatko | G06F 3/048 |
| | | | 715/776 |

(Continued)

OTHER PUBLICATIONS

S. Montgomery, "A Complete Guide to Crafting an Impactful Personal Statement," S. Montgomery Admissions Consulting. 12 pages. (https://smontgomeryconsulting.com) (available at least as early as Feb. 2021).

*Primary Examiner* — William D Titcomb
(74) *Attorney, Agent, or Firm* — Wilmer Cutler Pickering Hale and Dorr LLP

(57) ABSTRACT

An interactive writing system receives from a user, inputs of a plurality of short stories; receives from the user, a sequence of the plurality of short stories; arranges the plurality of short stories according to the received sequence; generates a plurality of one sentence summaries, wherein one of the plurality of one sentence summaries relates to one of the plurality of short stories; receives from the user, a selection of a word from one or the plurality of one sentence summaries; provides one or more suggested words corresponding to the selected word; displays a list of pre-determined criteria and corresponding reward; receives from the user, an indication that one or more of the list of pre-determined criteria are met; calculates a total reward received by the user; and displays the total rewards.

20 Claims, 23 Drawing Sheets

(56) References Cited

U.S. PATENT DOCUMENTS

| | | |
|---|---|---|
| 2012/0296635 A1 | 11/2012 | Brockett et al. |
| 2013/0227402 A1 | 8/2013 | Rossen-Knill et al. |
| 2013/0262449 A1 | 10/2013 | Arroyo et al. |
| 2013/0297997 A1 | 11/2013 | Stanley |
| 2015/0019589 A1 | 1/2015 | Arroyo et al. |
| 2015/0310073 A1 | 10/2015 | Chakrabarti et al. |
| 2016/0314121 A1 | 10/2016 | Arroyo et al. |
| 2017/0017630 A1 | 1/2017 | Barash et al. |
| 2018/0349336 A1* | 12/2018 | German ............... G09B 5/02 |
| 2019/0042572 A1 | 2/2019 | Moreno et al. |
| 2019/0355068 A1* | 11/2019 | Yu .................. G06Q 40/123 |
| 2020/0265186 A1 | 8/2020 | Donaldson et al. |
| 2021/0149993 A1 | 5/2021 | Torres |
| 2021/0150263 A1 | 5/2021 | Corwin et al. |
| 2022/0189333 A1* | 6/2022 | Yim .................. G06F 40/237 |
| 2022/0229996 A1 | 7/2022 | Hashimoto et al. |
| 2023/0009722 A1 | 1/2023 | Lee et al. |
| 2023/0367962 A1* | 11/2023 | Montgomery .......... G06F 40/30 |

\* cited by examiner

FIG. 19

INTERACTIVE WRITING PLATFORM

CROSS REFERENCE TO RELATED APPLICATION

This application is a continuation of U.S. patent application Ser. No. 18/196,360 filed May 11, 2023, which claims the benefit under 35 U.S.C. § 119(e), of provisional application U.S. Ser. No. 63/340,560, filed May 11, 2022, entitled "Interactive Writing Platform," the entire contents of which are incorporated herein by reference.

TECHNICAL FIELD

Embodiments of the present disclosure relate generally to an interactive writing platform.

BACKGROUND

Creating written narratives that weave together related concepts can pose a challenge for writers. Existing processes for assisting in writing often do not provide the writers with a visualized structure of an essay or an intuitive workflow to follow. Furthermore, the existing processes often lack flexibilities to accommodate different types of essays and mechanisms to incentivize self-review by the writers.

SUMMARY

Systems and methods are disclosed for an interactive writing platform.

In one aspect, the present disclosure describes a computer-implemented method. The method include: receiving from a user, by at least one processor, inputs of a plurality of short stories; receiving from the user, by the at least one processor, a sequence of the plurality of short stories; arranging, by the at least one processor, the plurality of short stories according to the received sequence; generating, by the at least one processor, a plurality of one sentence summaries, wherein one of the plurality of one sentence summaries relates to one of the plurality of short stories; receiving from the user, by the at least one processor, a selection of a word from one or the plurality of one sentence summaries; providing, by the at least one processor, one or more suggested words corresponding to the selected word; displaying, by the at least one processor, a list of pre-determined criteria and corresponding reward; receiving from the user, by the at least one processor, an indication that one or more of the list of pre-determined criteria are met; calculating, by the at least one processor, a total reward received by the user; and displaying, by the at least one processor, the total rewards.

In some embodiments, the method further includes displaying the plurality of short stories in a matrix format.

In some embodiments, the method further includes providing one or more suggested transition words.

In some embodiments, the list of pre-determined criteria is retrieved from a database.

In some embodiments, the list of pre-determined criteria is received from the user.

In another aspect, the present disclosure describes an interactive writing system. The system includes at least one processor, and at least one memory configured to store instructions, wherein the instructions, when executed, cause the at least one processor to: receive from a user, inputs of a plurality of short stories; receive from the user, a sequence of the plurality of short stories; arrange the plurality of short stories according to the received sequence; generate a plurality of one sentence summaries, wherein one of the plurality of one sentence summaries relates to one of the plurality of short stories; receive from the user, a selection of a word from one or the plurality of one sentence summaries; provide one or more suggested words corresponding to the selected word; display a list of pre-determined criteria and corresponding reward; receive from the user, an indication that one or more of the list of pre-determined criteria are met; calculate a total reward received by the user; and display the total rewards.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE FIGURES

Various objects, features, and advantages of the disclosed subject matter can be more fully appreciated with reference to the following detailed description of the disclosed subject matter when considered in connection with the following drawings.

Figure 19:
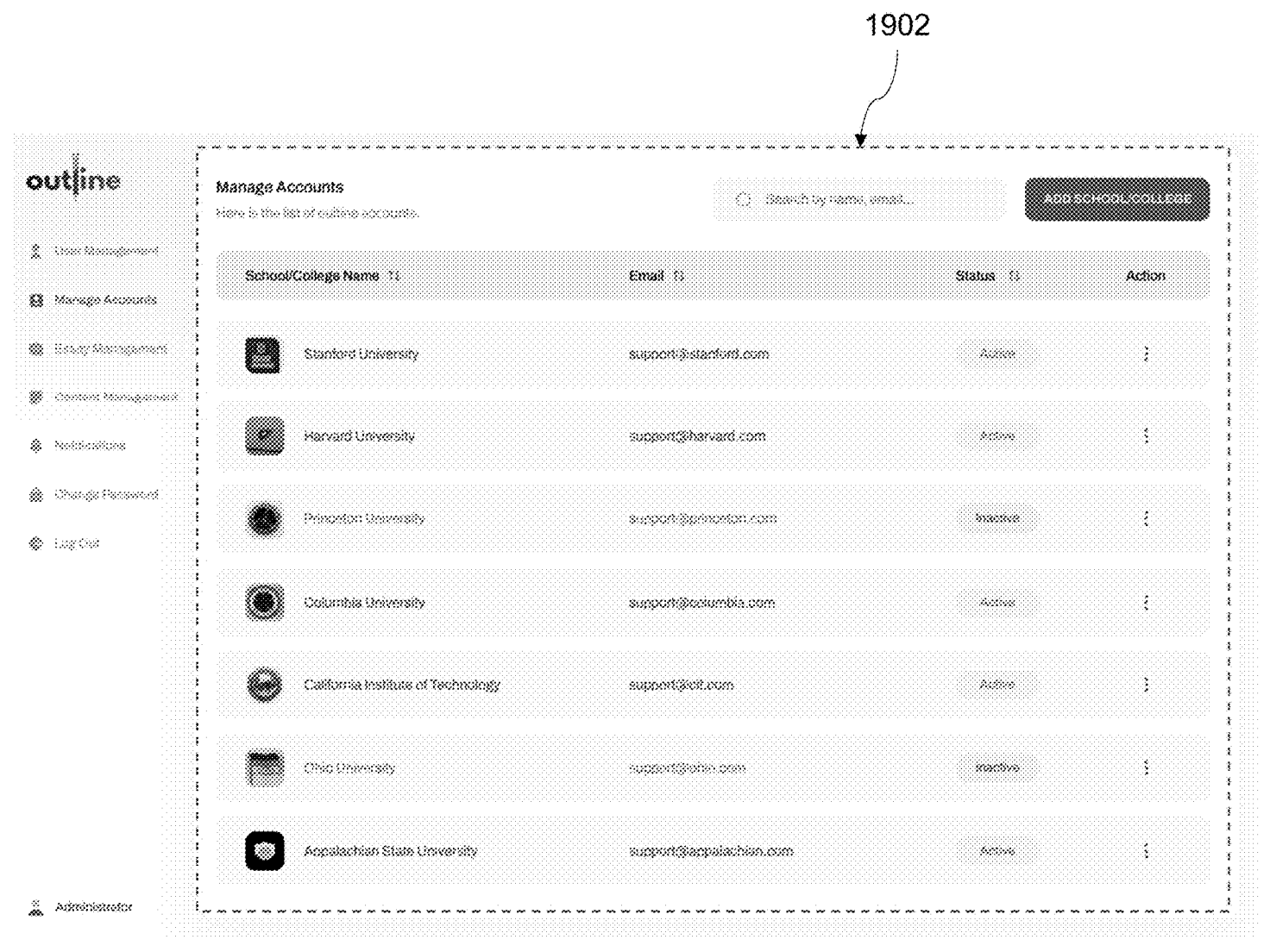

FIG. 19 illustrates an exemplary user interface depicting an account management screen in an exemplary interactive writing platform according to certain embodiments of the present disclosure.

Figure 1:
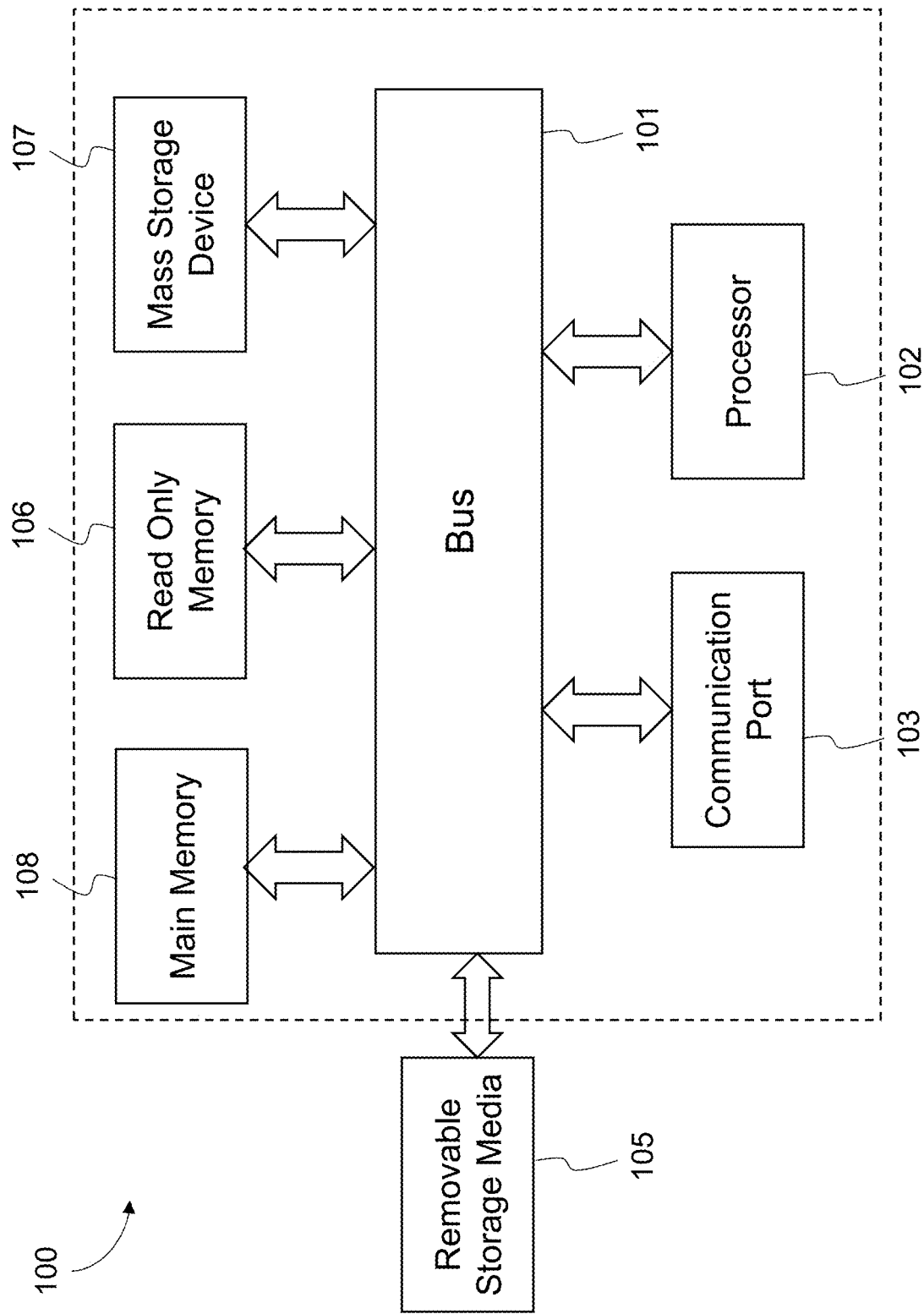
FIG. 1 illustrates a computer system, according to embodiments of the present disclosure.

While the present disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the present disclosure.

DETAILED DESCRIPTION

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

FIG. 1 illustrates an exemplary computer platform, including a processor 102 and other hardware which may be used to implement the functionality described herein. For example, any one or more of the systems described herein may incorporate, or be incorporated within, a computer system 100, according to embodiments of the present disclosure. According to the present example, the computer system includes a bus 101, at least one processor 102, at least one communication port 103, a main memory 108, a removable storage media 105, a read only memory 106, and a mass storage 107.

Processor(s) 102 can be any known processor, or any known microprocessor or processor for a mobile device. Communication port(s) 103 can be, for example, any of an RS-232 port for use with a modem based dialup connection, a copper or fiber 10/100/1000 Ethernet port, or a Bluetooth® or WiFi interface, and/or an infrared port, or combination of those. Communication port(s) 103 may be chosen depending on a network such a Local Area Network (LAN), Wide Area Network (WAN), or any network to which the computer system 100 connects. Main memory 108 can be Random Access Memory (RAM), or any other dynamic storage device(s) commonly known to one of ordinary skill in the art. Read Only Memory (ROM) 106 can be any static storage device(s) such as Programmable Read Only Memory (PROM) chips for storing static information such as instructions for processor 102, for example.

Mass storage 107 can be used to store information and instructions. For example, flash memory or other storage media can be used, including removable or dedicated memory in a mobile or portable device, according to embodiments of the present disclosure. As another example, hard disks such as SCSI drives, an optical disc, an array of disks such as RAID, or any other mass storage devices can be used. Bus 101 communicably couples processor(s) 102 with the other memory, storage and communication blocks. Bus 101 can be a PCI/PCI-X or SCSI based system bus depending on the storage devices used, for example. Removable storage media 105 can be any kind of external hard-drives, floppy drives, flash drives, zip drives, compact disc—read only memory (CD-ROM), compact disc—rewritable (CD-RW), or digital video disk—read only memory (DVD-ROM), for example. The components described above are meant to exemplify some types of possibilities. In no way should the aforementioned examples limit the scope of the disclosure, as they are only exemplary embodiments of computer system 100 and related components; numerous other computer hardware and/or firmware components are contemplated by the present disclosure.

FIGS. 2-15 illustrate screen shots from an exemplary user interface of an exemplary interactive writing platform, according to embodiments of the present disclosure. The exemplary interactive writing platform shown in these screen shots is an essay writing platform, but could be any of the other platforms or systems discussed herein. In certain embodiments, the user interface is provided on a computing device with a display. In certain embodiments, the computing device is a mobile communication device, a tablet computer, a laptop computer, or a desktop computer. In certain embodiments, the display is a touch screen.

Figure 2:
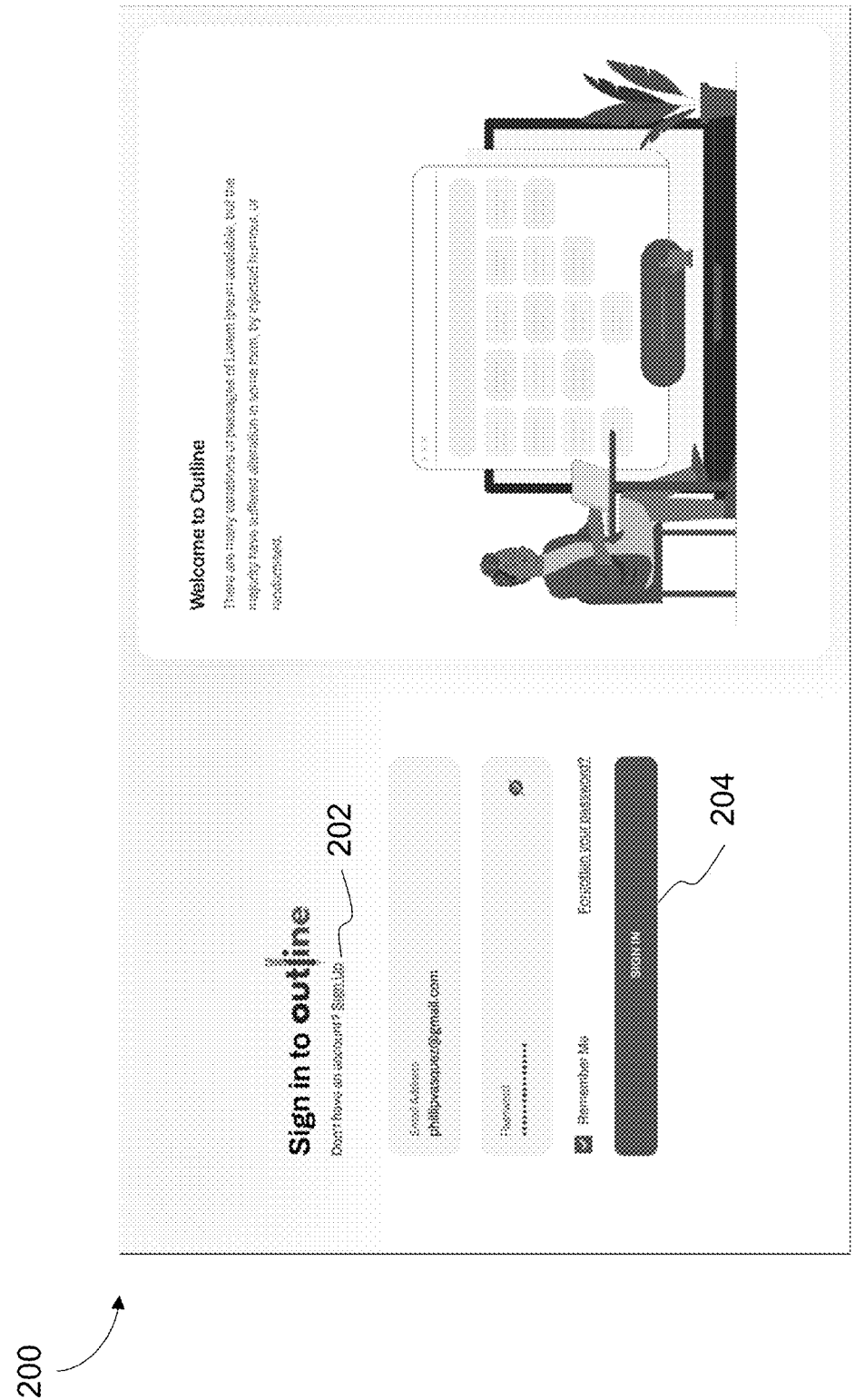
FIG. 2 illustrates an exemplary user interface for logging into an exemplary interactive writing platform according to certain embodiments of the present disclosure.

FIG. 2 illustrates an exemplary user interface depicting a login screen 200 where a user may log into an interactive writing platform, according to embodiments of the present disclosure. The login screen 200 can include fields where a user enters login information, e.g., a user account name, a user ID, an email address, a password, a passcode, etc. In some embodiments, clicking on or selecting the sign in link 204 takes the user to the exemplary main dashboard screen 500 of FIG. 5. If the user does not have an account or has not signed up with the platform yet, clicking on or selecting the sign up link 202 takes the user to a sign up screen, e.g., exemplary sign up screen 300 of FIG. 3. As used herein, "clicking," "clicking on," "selecting," and "choosing" are used interchangeably to refer to a user's action, by whatever mechanism, for activating a link associated with a portion of the user interface, including by touching the link on a touch screen interface, clicking or double clicking with a mouse, or using audio or visual prompts or selections.

Figure 3:
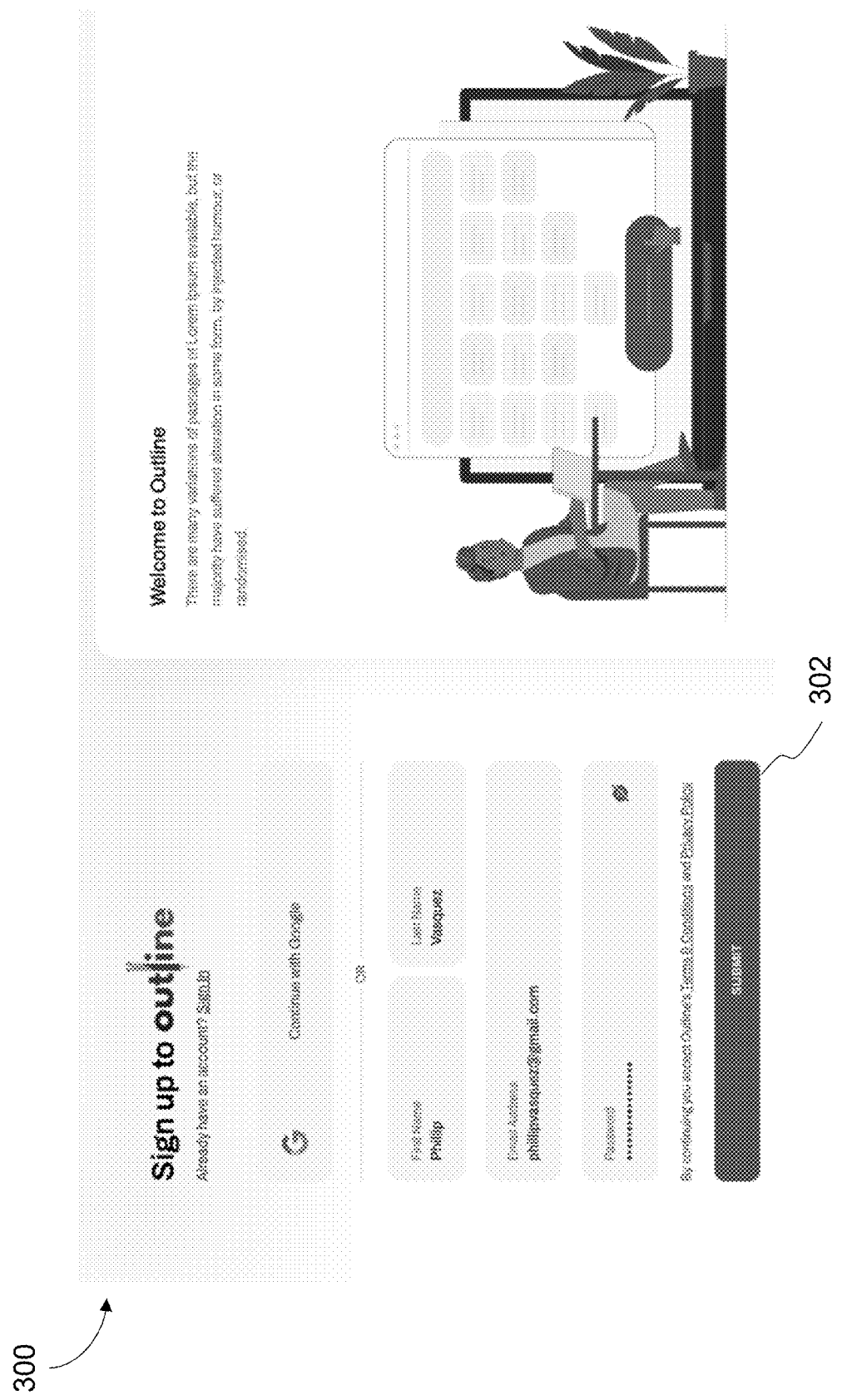
FIG. 3 illustrates an exemplary user interface for signing up for an exemplary interactive writing platform according to certain embodiments of the present disclosure.
Figure 4:
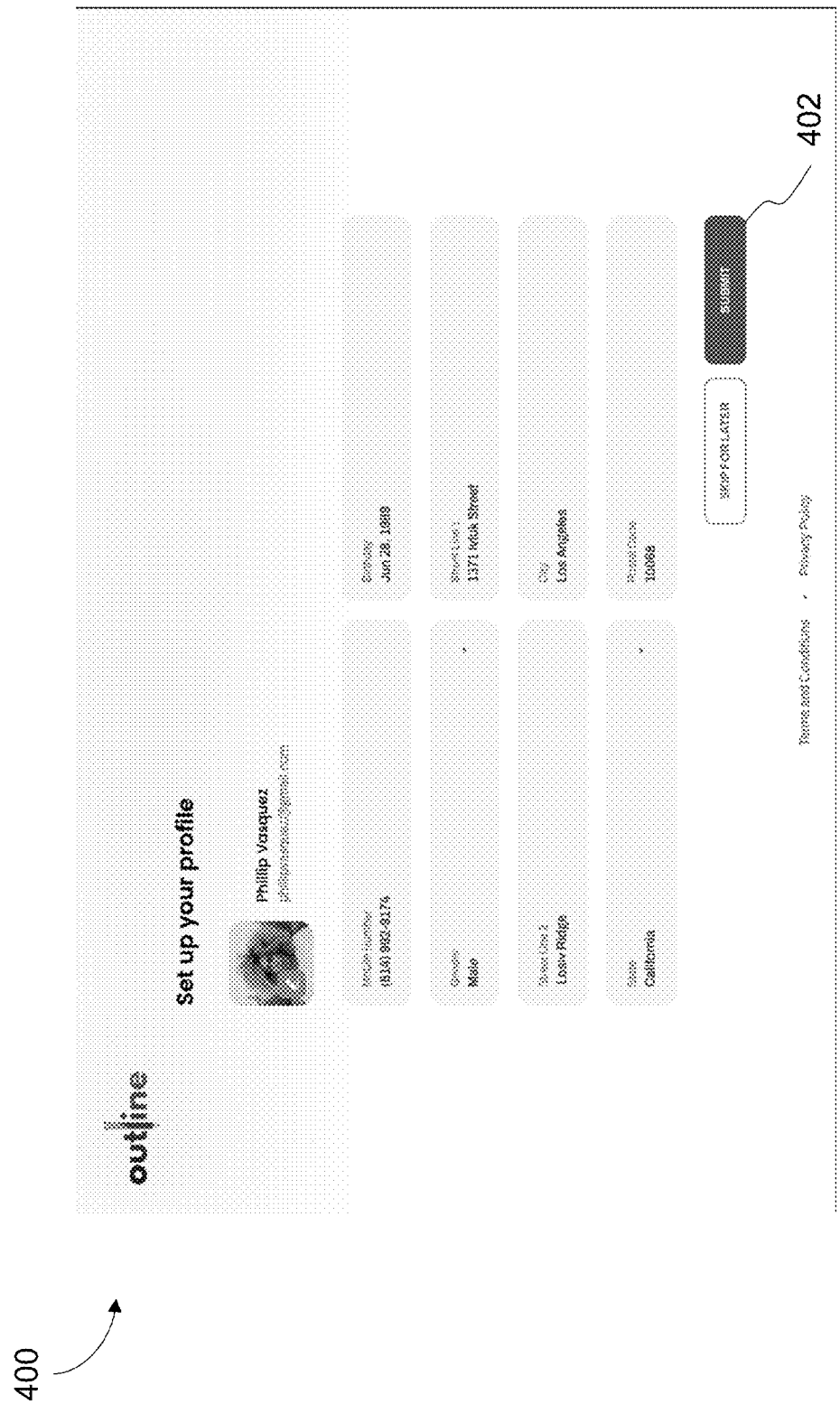
FIG. 4 illustrates an exemplary user interface for setting up a personal profile in an exemplary interactive writing platform according to certain embodiments of the present disclosure.

As shown in FIG. 3, the sign up interface 300 may include fields where the user can enter personal information (e.g., name, email address, etc.) and create a login credential (e.g., a password, a passcode, etc.). In some embodiments, clicking on or selecting the submit link 302 takes the user to a personal profile screen, e.g., the exemplary personal profile screen 400 of FIG. 4. The user can enter additional personal information, such as, phone number, date of birth, gender, address, etc. In some embodiments, clicking on or selecting the submit 402 link takes the user to the exemplary main dashboard screen 500 of FIG. 5.

Figure 5:
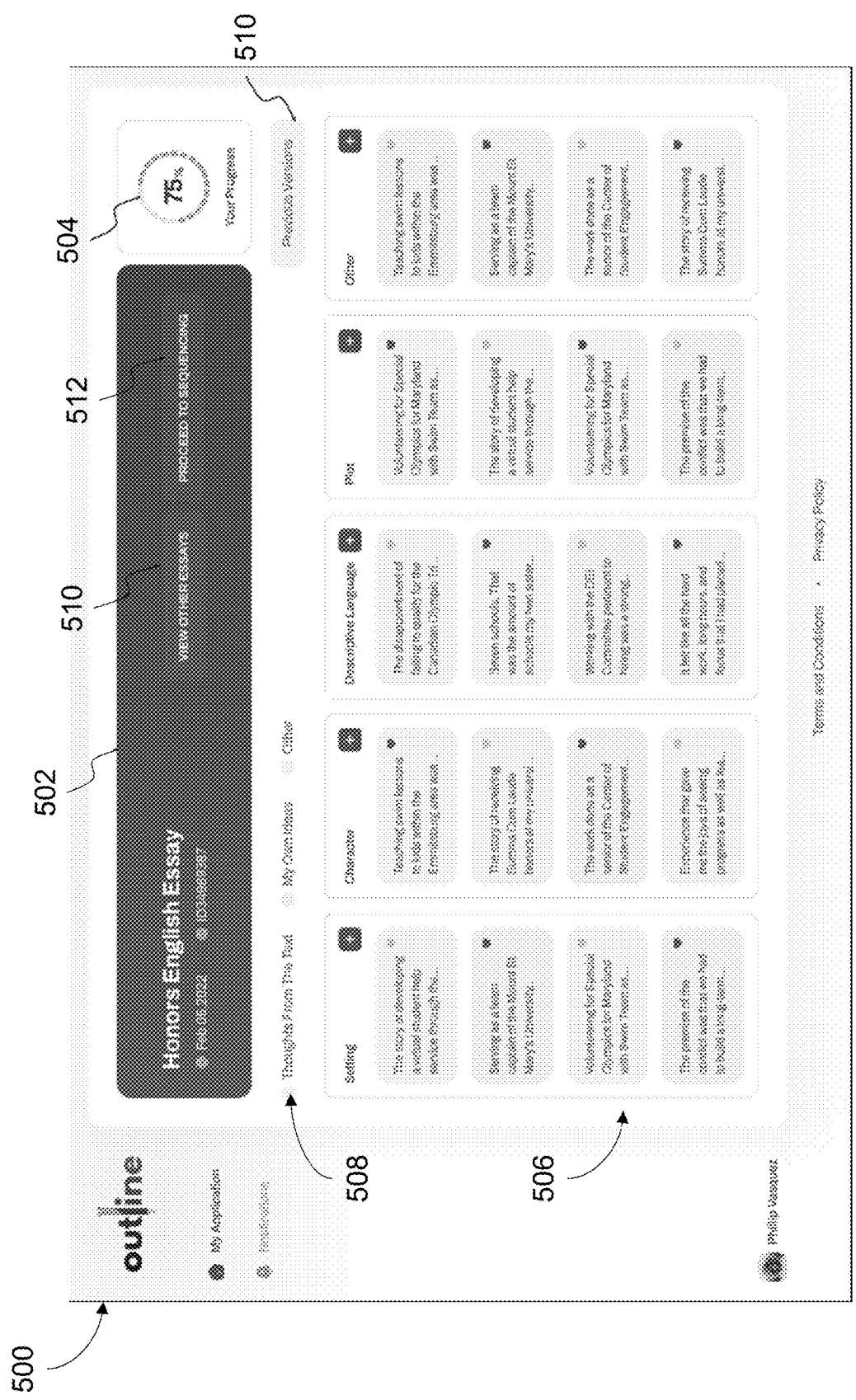
FIG. 5 illustrates an exemplary user interface depicting a main dashboard of an exemplary interactive writing platform according to certain embodiments of the present disclosure.
Figure 6:
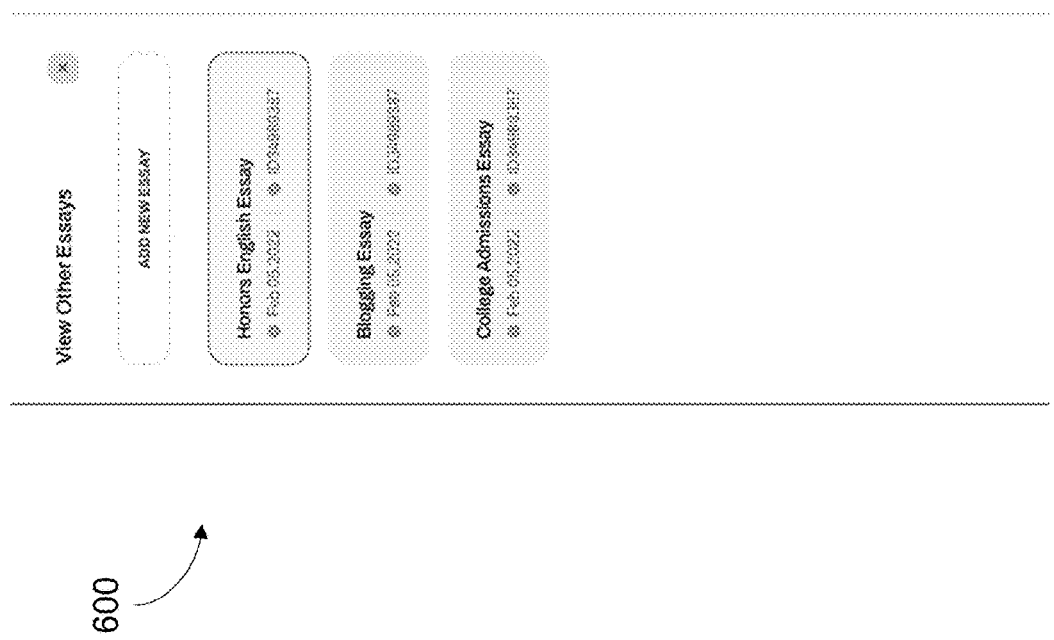
FIG. 6 illustrates an exemplary user interface depicting a plurality of saved essays in an exemplary interactive writing platform according to certain embodiments of the present disclosure.
Figure 7:
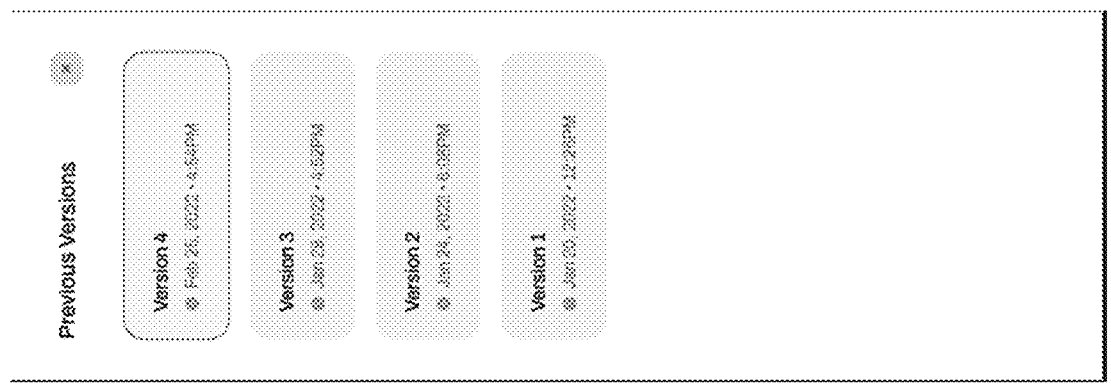
FIG. 7 illustrates an exemplary user interface for accessing previous versions of a saved essay in an exemplary interactive writing platform according to certain embodiments of the present disclosure.
Figure 8:
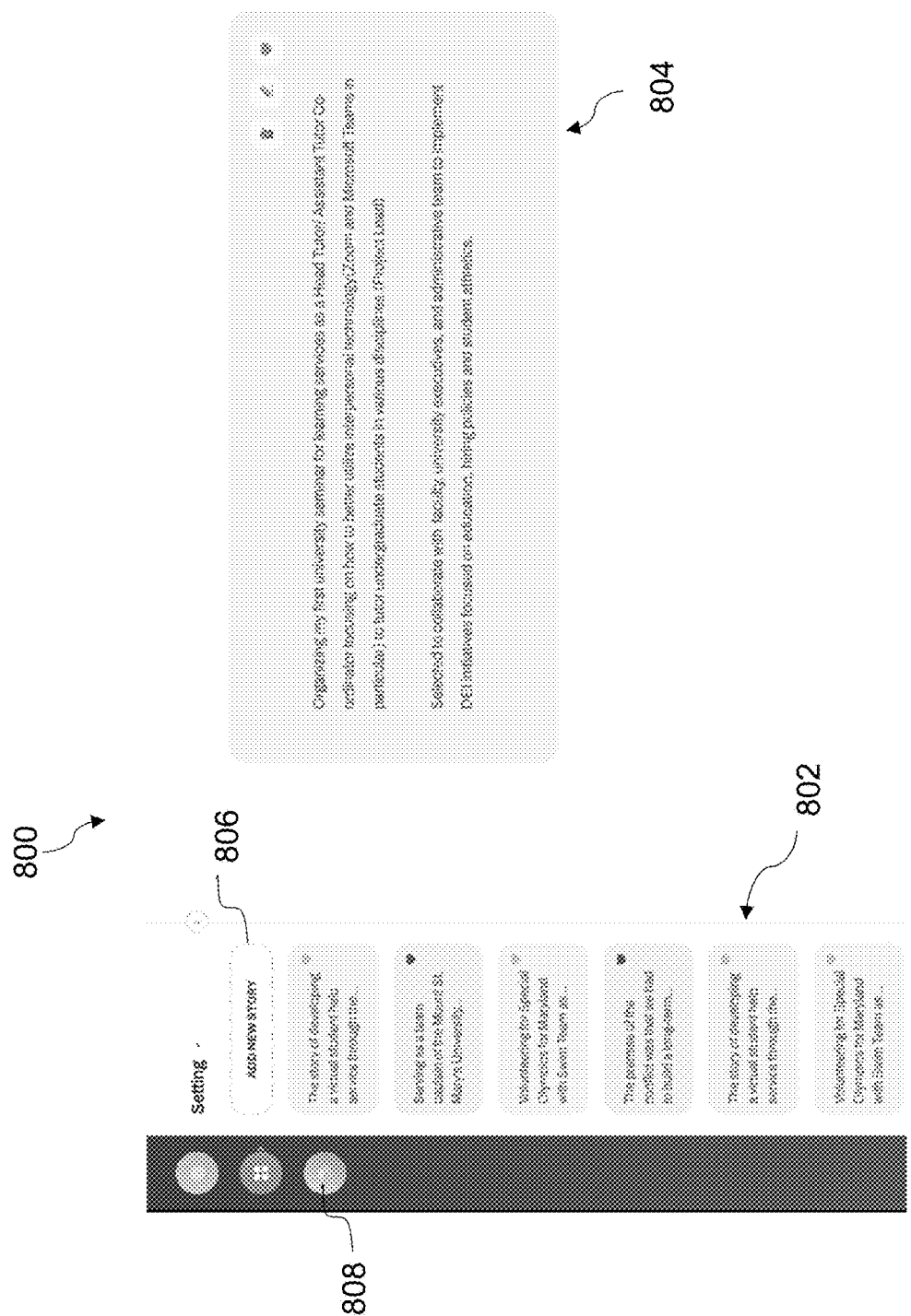
FIG. 8 illustrates an exemplary user interface for viewing a story overview in an exemplary interactive writing platform according to certain embodiments of the present disclosure.

FIG. 5 illustrates an exemplary main dashboard screen 500 of an interactive writing platform, according to embodiments of the present disclosure. The main dashboard screen 500 can include a document information portion 502 listing basic information of the document currently being viewed (e.g., title, document ID, date of last edit, etc.), and a document progress indicator 504 showing a status of the completeness of the document (e.g., a percentage number, a progress bar, etc.), according to embodiments of the present disclosure. The main dashboard screen 500 can also include a story matrix portion 506 and a category list 508, according to embodiments of the present disclosure. The story matrix portion 506 can show a list of stories entered by the user. The stories can be organized by different ways, for example, by a plurality of different subjects assigned by the user. In some embodiments, the stories can be shown as a matrix, with each column corresponding to a subject which is associated with the stories in that column. The category list 508 can include a list of categories, labels, or tags specified by the user, which can be associated with one or more stories. The user can click on one of the categories to filter the stories shown in the story matrix portion 506 so that only stories associated with the selected category are shown. Clicking on or selecting the view other essays link 510 takes the user to an interface 600 showing all the saved essays, e.g., as shown in FIG. 6, according to embodiments of the present disclosure. The main dashboard screen 500 can also include a version control feature, according to embodiments of the present disclosure. Clicking on or selecting the previous versions link 510 triggers a version list interface 700 which shows all previous versions of the document saved by the user. An exemplary version list interface is depicted in FIG. 7.

Clicking on or selecting one of the subject columns in the story matrix portion 506 takes the user to a story overview interface, e.g., exemplary story overview interface 800, according to embodiments of the present disclosure. The story overview interface 800 can include a list portion 802 showing stories associated with a selected subject, as well as a portion 804 showing the full text content of a specific story selected by the user. In some embodiments, the portion 804 can include buttons for the user to perform certain operations on the story (e.g., editing, deleting, or marking as favorite, etc.).

Figure 9:
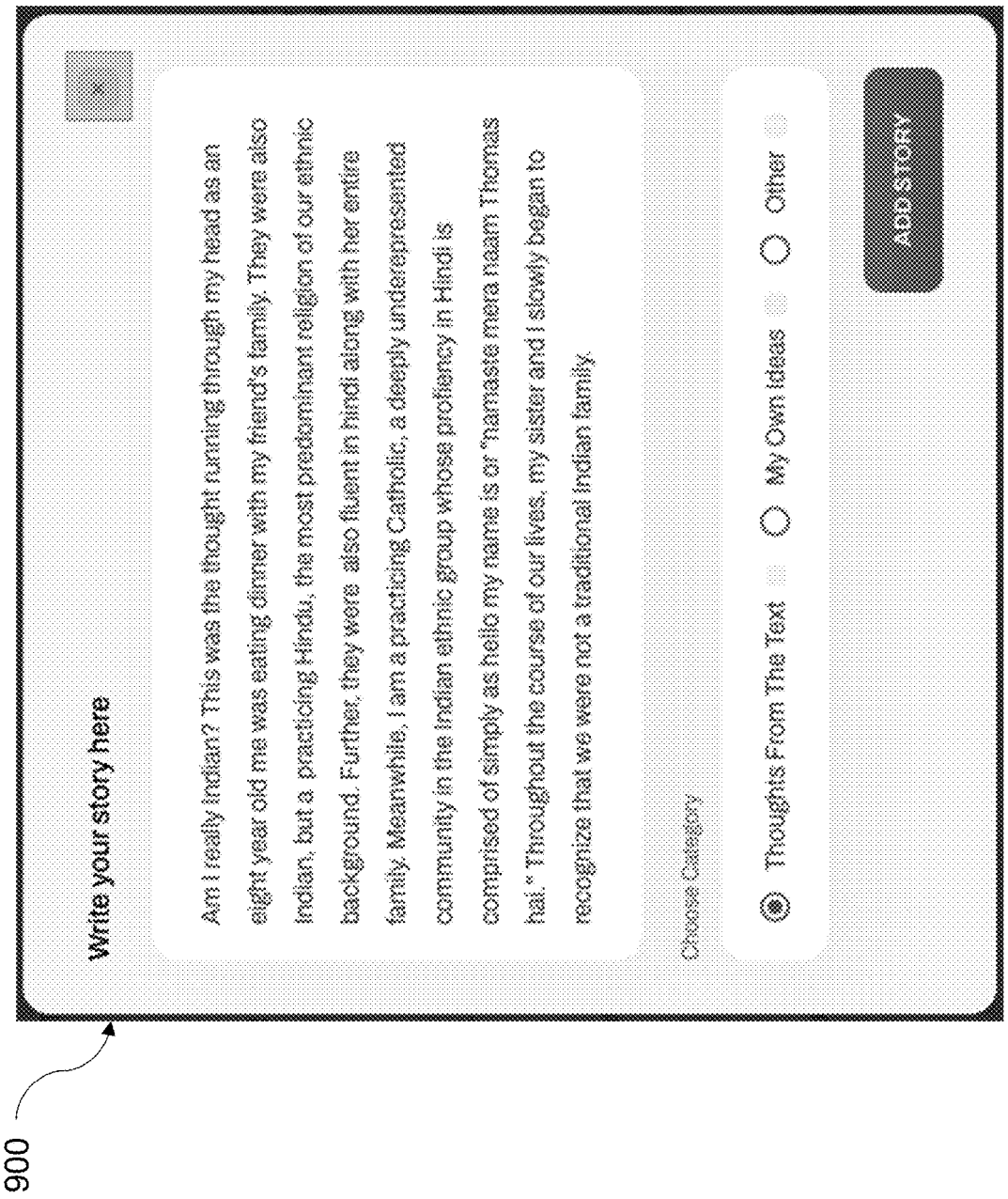
FIG. 9 illustrates an exemplary user interface for editing a story in an exemplary interactive writing platform according to certain embodiments of the present disclosure.

Clicking on or selecting the add new story link 806 takes the user to a story editing interface, e.g., exemplary story editing interface 900, as shown in FIG. 9, according to embodiments of the present disclosure. The user can enter text of the new story and assign a category to the story.

Figure 10:
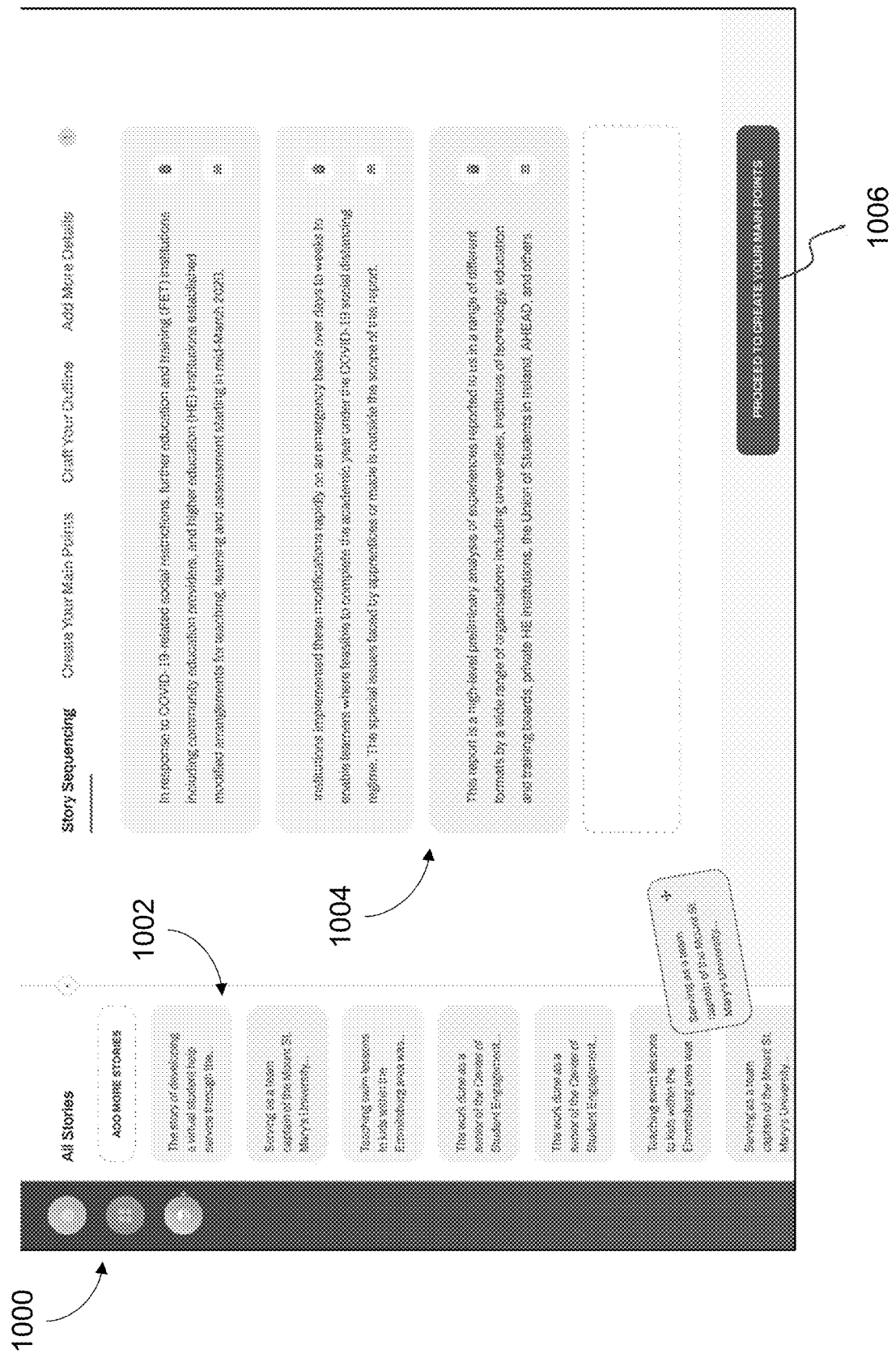
FIG. 10 illustrates an exemplary user interface for sequencing a story in an exemplary interactive writing platform according to certain embodiments of the present disclosure.

Clicking on or selecting the proceed to sequencing link 512 on the main dashboard screen 500, or the proceed to sequencing link 808 on the story editing interface 800 takes the user to a story sequencing interface, e.g., exemplary story sequencing interface 1000, as shown in FIG. 10, according to embodiments of the present disclosure. The user can select stories from a story list portion 1002 and then drag and drop in a sequencing portion 1004. The user can delete a story from the sequence or change the order of the stories shown in the sequencing portion 1004.

Figure 11:
FIG. 11 illustrates an exemplary user interface for creating main points in an exemplary interactive writing platform according to certain embodiments of the present disclosure.

Clicking on or selecting the proceed to create your main points link 1006 takes the user to a main points interface, e.g., exemplary main points interface 1100, as shown in FIG. 11, according to embodiments of the present disclosure. The interface 1100 can include a list of stories saved by the user and a text field for each story. In some embodiments, the user can enter a short summary for each of the stories. In certain embodiments, the short summary is a one sentence summary. In some embodiments, the interactive writing platform can generate a short summary, e.g., a one sentence summary for each of the stories using artificial intelligence (AI) or machine learning.

Figure 12:
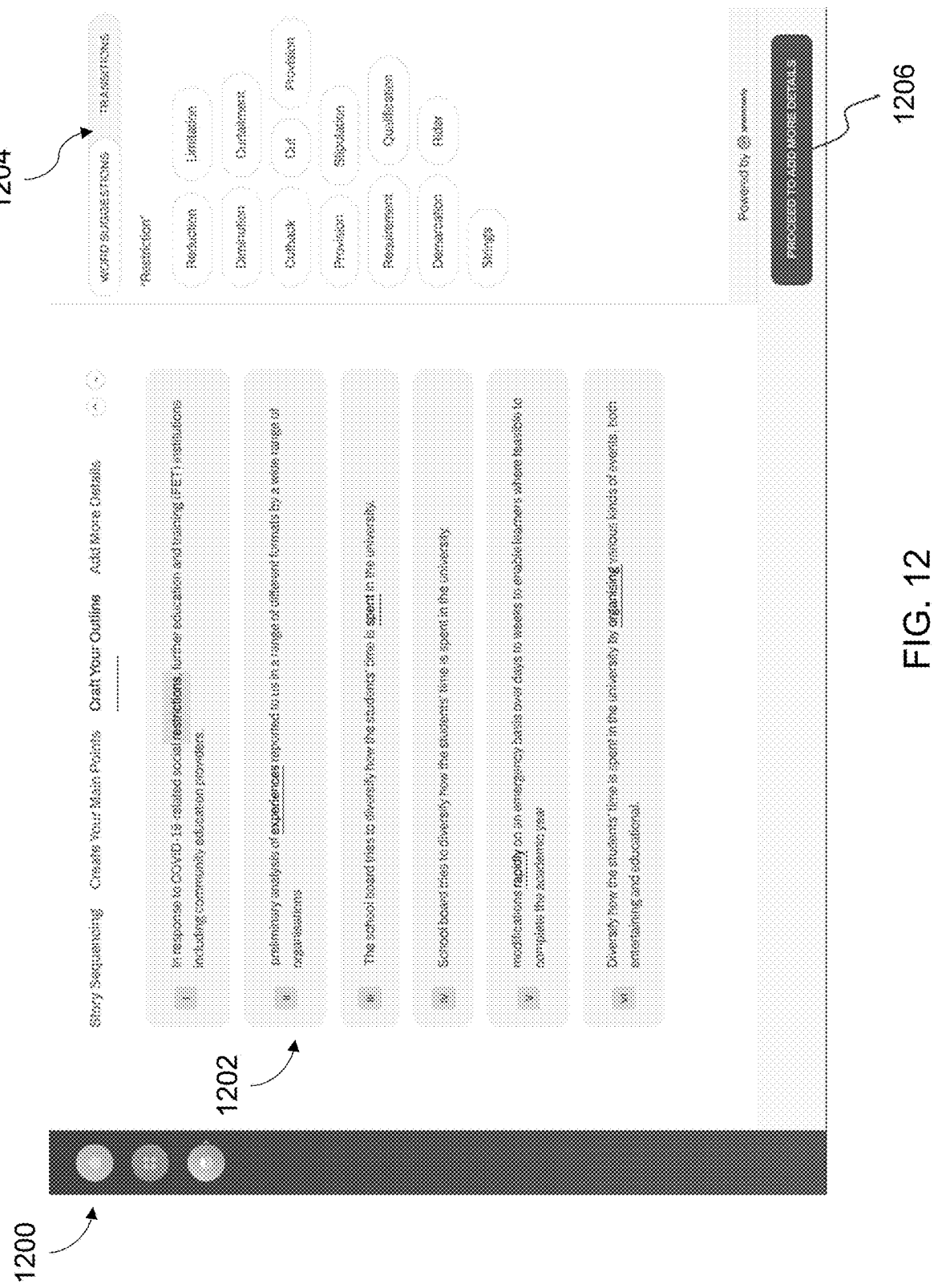
FIG. 12 illustrates an exemplary user interface for creating an outline in an exemplary interactive writing platform according to certain embodiments of the present disclosure.

Clicking on or selecting the proceed to outline link 1102 takes the user to an outline interface, e.g., exemplary outline interface 1200, as shown in FIG. 12, according to embodiments of the present disclosure. The outline interface 1200 can include a portion 1202 which shows a list of the one sentence summaries created by the user, and a suggestion portion, e.g., exemplary suggestion portion 1204 which shows word suggestions. In some embodiments, the user can select or highlight a word in one of the one sentence summaries, and the suggestion portion 1204 can show a list of recommended words which are synonyms of the selected/highlighted word. In some embodiments, the suggestion portion 1204 can include suggested transition words to link together the one sentence summaries to form a cohesive narrative.

Figure 13:
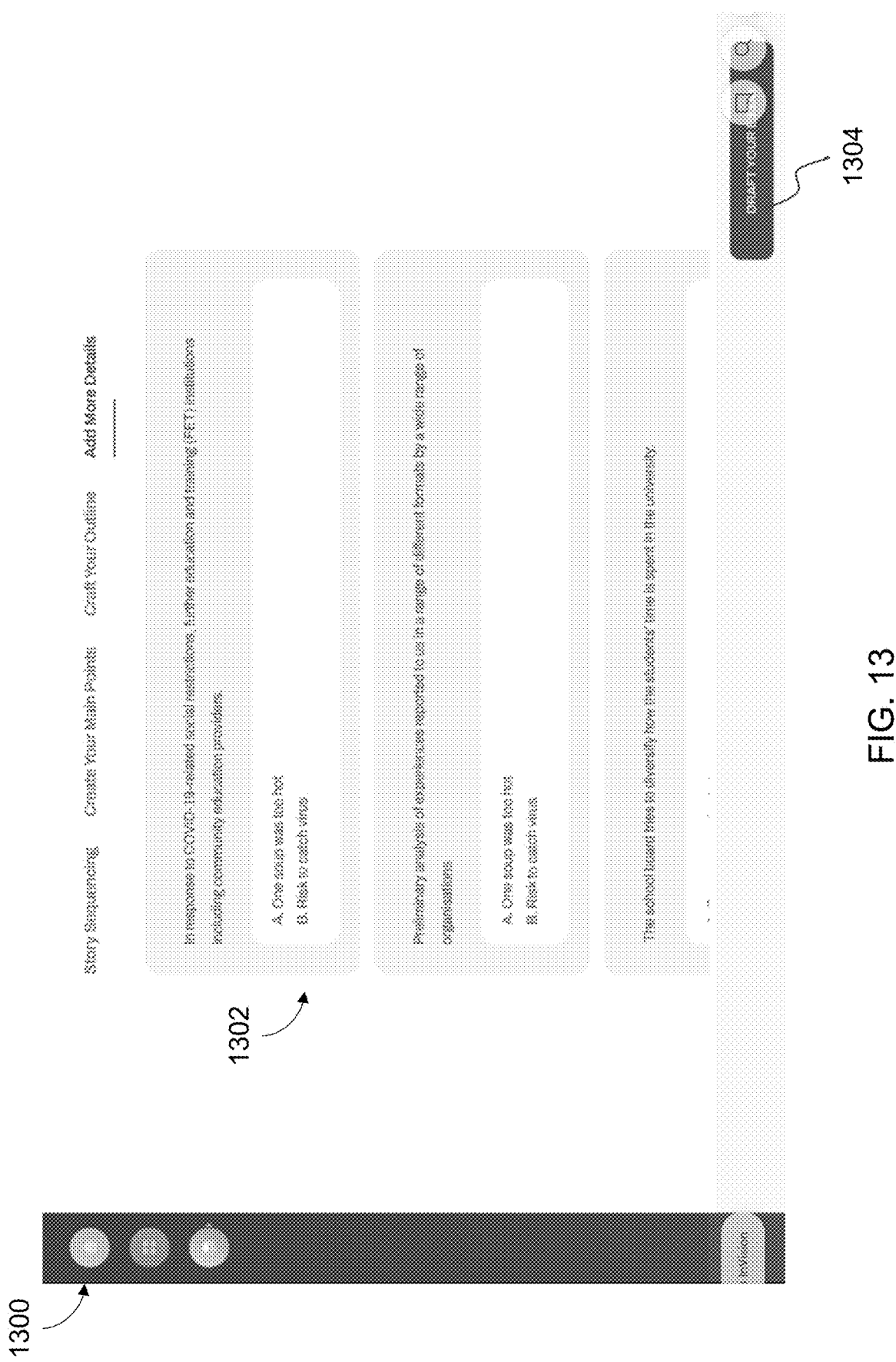
FIG. 13 illustrates an exemplary user interface for adding or editing details an exemplary interactive writing platform according to certain embodiments of the present disclosure.

Clicking on or selecting the proceed to add more details link 1206 takes the user to a details editing interface, e.g., exemplary details editing interface 1300, as shown in FIG. 13, according to embodiments of the present disclosure. The details editing interface 1300 can include a portion 1302 where the user can add more details to the created outline.

Figure 14:
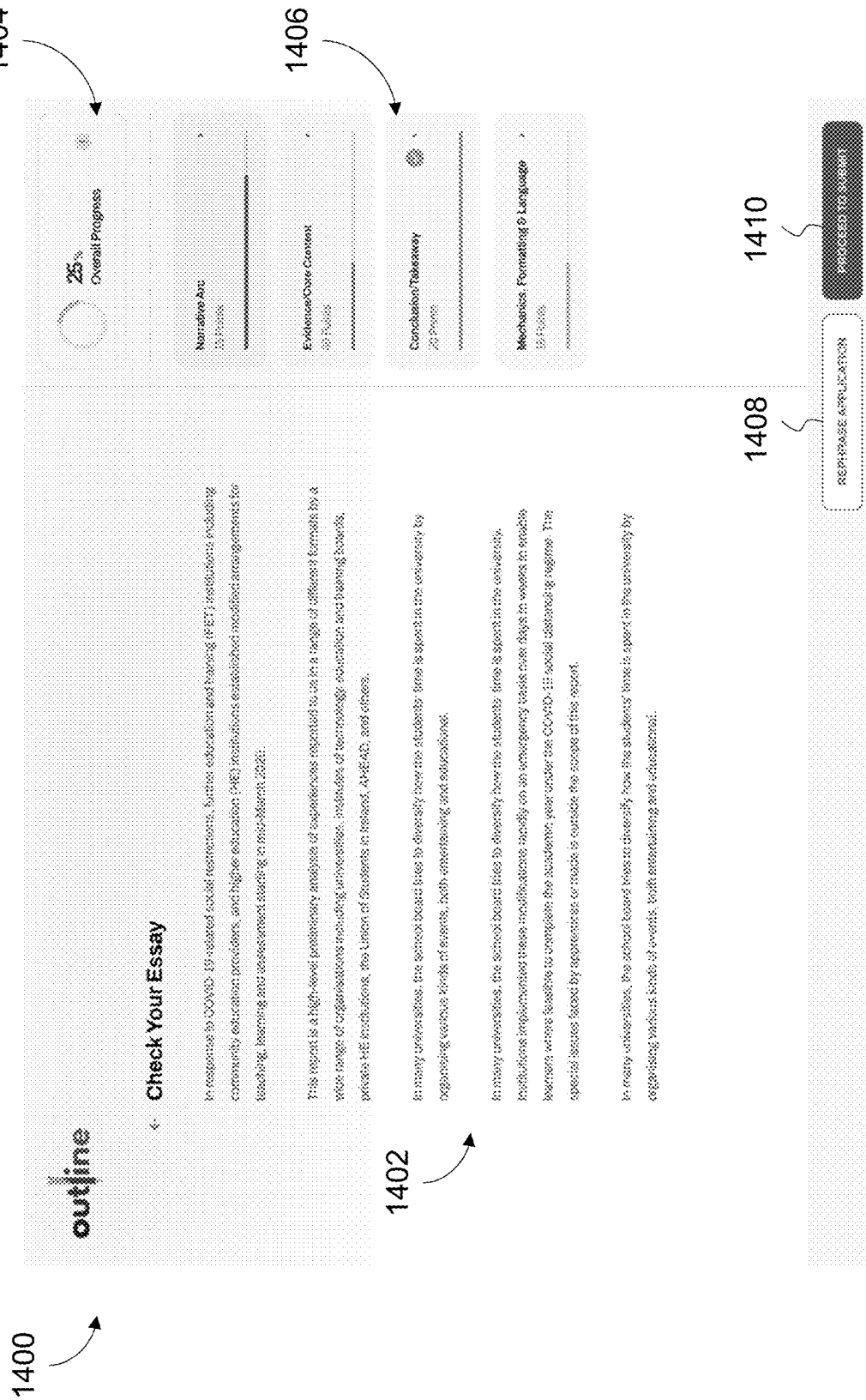
FIG. 14 illustrates an exemplary user interface for reviewing an essay in an exemplary interactive writing platform according to certain embodiments of the present disclosure.

Clicking on or selecting the draft your essay link 1304 takes the user to an essay review interface, e.g., exemplary essay review interface 1400, as shown in FIG. 14, according to embodiments of the present disclosure. The essay review interface 1400 can include a portion 1402 displaying the completed essay for the user's review, a document progress indicator 1404 showing a status of the completeness of the document (e.g., a percentage number, a progress bar, etc.), and a rubric checker portion 1406. In some embodiments, the rubric checker portion 1406 can include a list of criterion categories and corresponding points or rewards. For example, the criterion categories for an essay can include "Narrative Arc," "Evidence/Core Content," "Conclusion/Takeaway," and "Mechanics, Formatting & Language." The rubric checker portion 1406 can depict a status of the completeness of each criterion category for the essay, e.g., a percentage number, a progress bar etc. for each criterion category.

Figure 15:
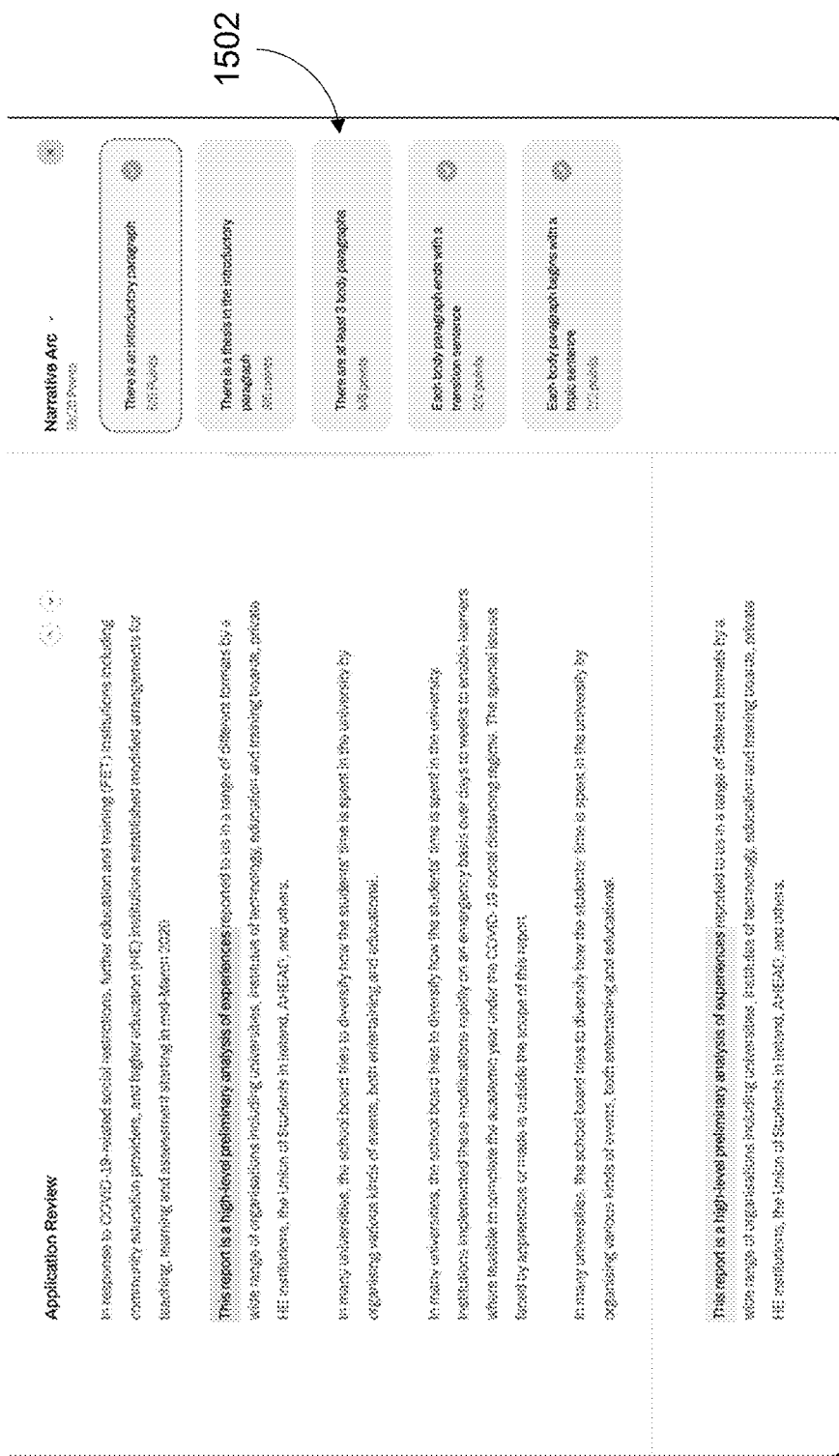
FIG. 15 illustrates an exemplary user interface including a detailed rubric in an exemplary interactive writing platform according to certain embodiments of the present disclosure.

Clicking on or selecting a criterion category in the rubric portion 1406 takes the user to a detailed rubric interface, e.g., exemplary detailed rubric interface 1502, as shown in FIG. 15, according to embodiments of the present disclosure. The detailed rubric interface 1502 can include a list of specific criteria under the criterion category and the corresponding points or rewards. For example, under the "Narrative Arc" category, there can be plurality of specific criteria, such as the presence of an introductory paragraph, a thesis in the introductory paragraph, at least three body paragraphs, each body paragraph ending with a transition sentence, etc. In some embodiments, the specific criteria and corresponding points or rewards can be set up by the user. In some embodiments, the specific criteria and corresponding points or rewards can be set up by a system administrator (e.g., a teacher, a tutor, an admissions officer etc.). The user can review the completed essay and determine if a specific criterion is met. If the specific criterion is met, the user can click on a corresponding box and receive the allocated points or rewards.

In some embodiments, the specific criteria and corresponding points or rewards can be unique to a specific essay. For example, there can be separate criteria for a writing class essay, a blog post, an email, or a personal statement for a college application. In some embodiments, the specific criteria and corresponding points or rewards can be universal and applied a plurality of essay or document type.

In some embodiments, a user can upload an essay to the interactive writing platform to user the rubric checker and check the writing against self-provided or administrator-uploaded rubric criteria. The user can choose from suggested rubric criteria, add his or her own customizable criteria, or combinations thereof. The user can then highlight the portion of the essay that corresponds with the rubric criteria category. In some embodiments, the interactive writing platform can user artificial intelligence (AI) or machine learning techniques in checking an essay against a rubric criterion. In some embodiments, if the user's highlighted essay portion corresponds to those rubric criteria, the user will receive a green checkmark and corresponding points or rewards. In some embodiments, the user will need to accumulate a certain number of points or rewards in order to submit their essay.

Once the user completes all the rubric checks, the received points or rewards can be shown in the rubric checker portion 1406 of the essay review interface. If the user is not satisfied with the completed essay, clicking on or selecting the rephrase essay link 1408 can take the user back to the main points interface 1100 so that the user can make edits to the stories and outlines. Once the user is satisfied with the completed essay, he or she can click on or select the proceed to submit link 1410. In some embodiments, the user needs to receive a number of points or rewards greater than a pre-determined threshold to be able to submit the completed essay. For example, if the received number of points or rewards is less than the threshold, the proceed to submit link 1410 may not be active.

FIGS. 16-23 illustrate screen shots from an exemplary administrator interface of an exemplary interactive writing platform, according to embodiments of the present disclosure. The exemplary interactive writing platform shown in these screen shots is an essay writing platform, but could be any of the other platforms or systems discussed herein. In certain embodiments, the user interface is provided on a computing device with a display. In certain embodiments, the computing device is a mobile communication device, a tablet computer, a laptop computer, or a desktop computer. In certain embodiments, the display is a touch screen.

Figure 16:
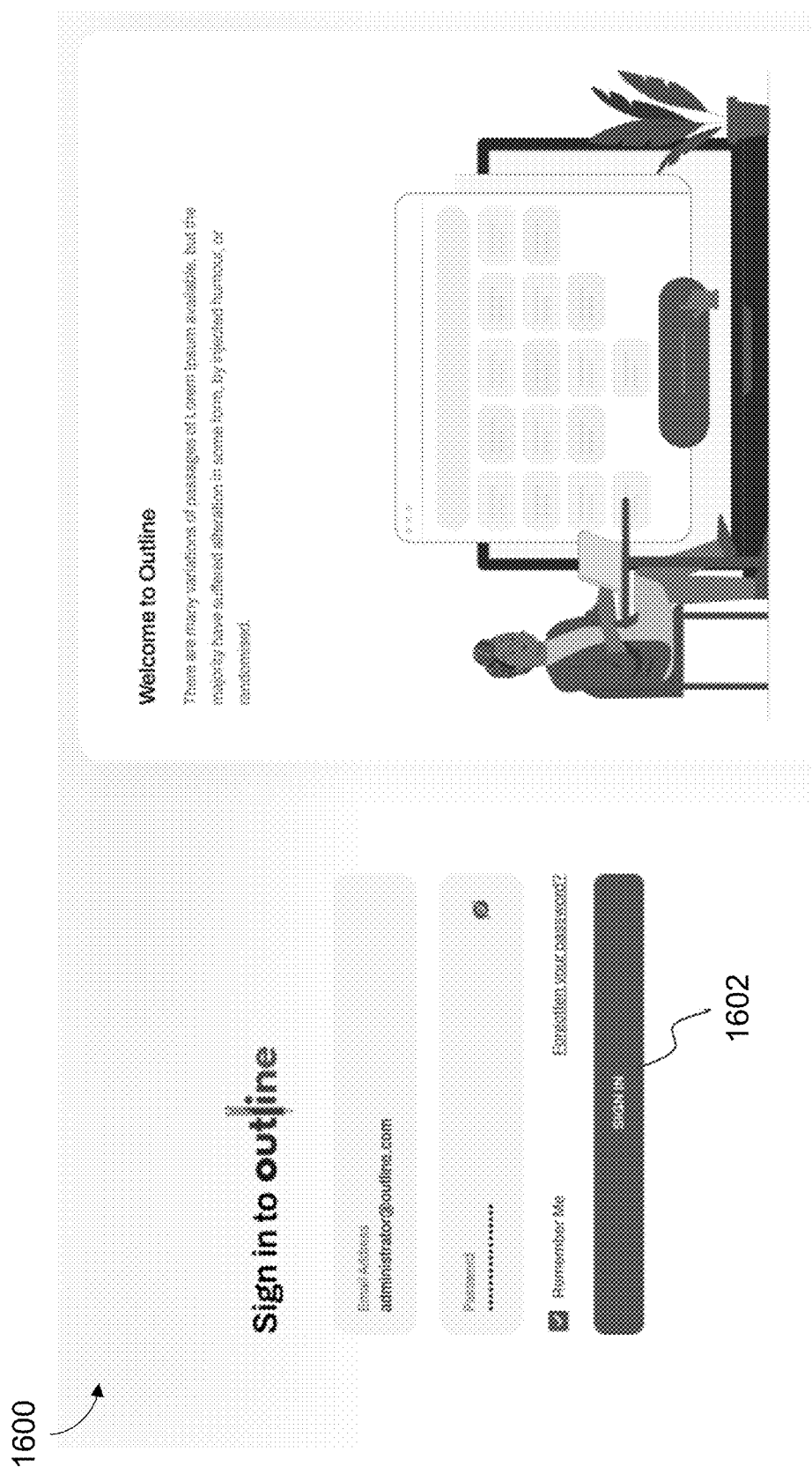
FIG. 16 illustrates an exemplary user interface for an administrator sign in screen for signing into an exemplary interactive writing platform according to certain embodiments of the present disclosure.

FIG. 16 illustrates an administrator login screen 1600 of an exemplary interactive writing platform, according to embodiments of the present disclosure. An administrator can enter login credential (e.g., a user name, an email address, a password, a passcode, etc.).

Figure 17:
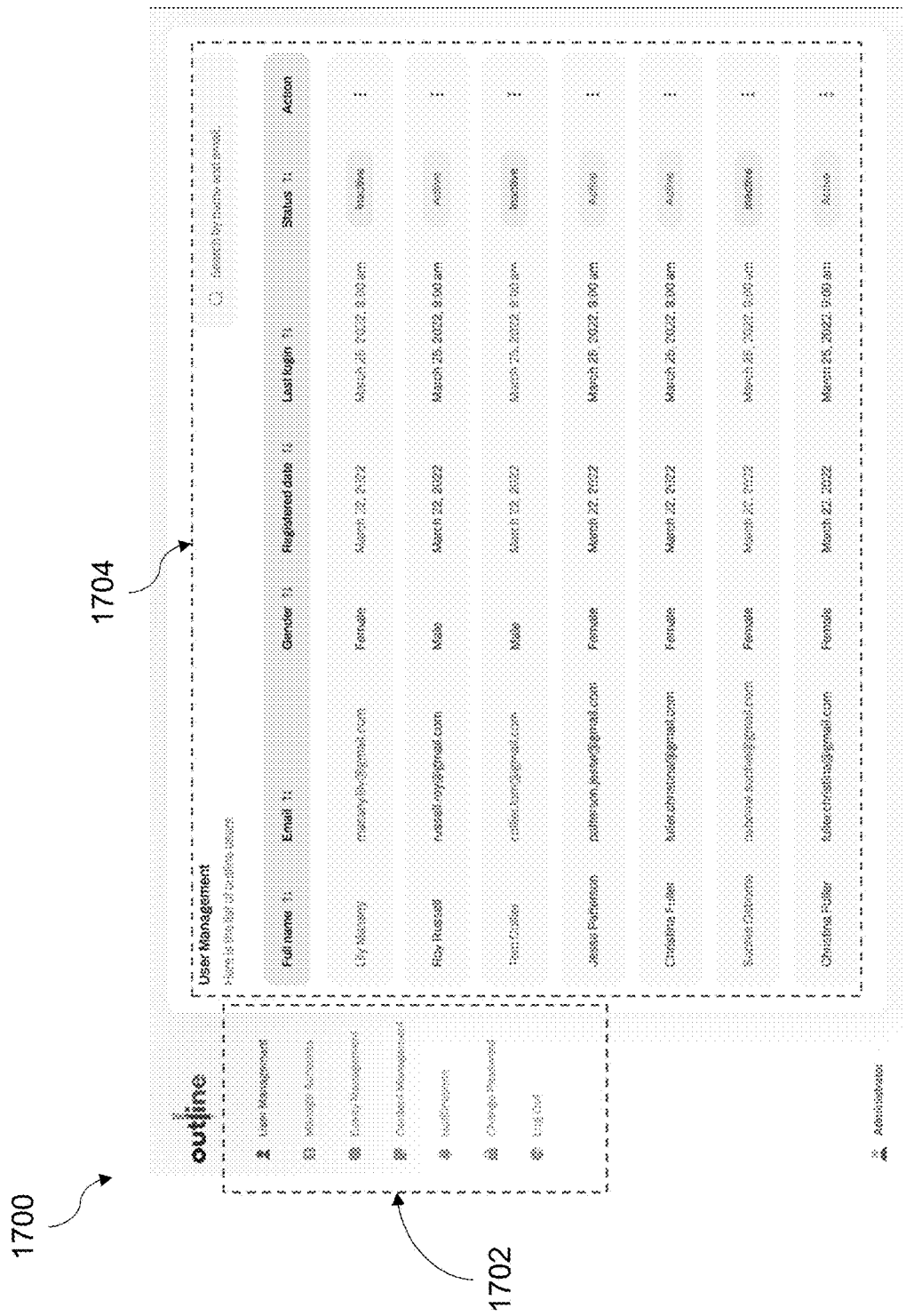
FIG. 17 illustrates an exemplary user interface depicting a main control screen in an exemplary interactive writing platform according to certain embodiments of the present disclosure.

Clicking on or selecting the sign in link 1602 takes the administrator to a main control screen 1700, as shown in FIG. 17, according to embodiments of the present disclosure. The main control screen 1700 can include a portion 1702 showing the available control menus and a portion 1704 showing detailed information for a selected control menu. For example, the available control menus can include "User Management," "Manage Accounts," "Essay Management," etc. If the menu "User Management" is selected, information of all users who signed up with the interactive writing platform can be shown in the portion 1704.

Figure 18:
FIG. 18 illustrates an exemplary user interface depicting a user overview screen in an exemplary interactive writing platform according to certain embodiments of the present disclosure.
Figure 20:
FIG. 20 illustrates an exemplary user interface depicting an essay management screen in an exemplary interactive writing platform according to certain embodiments of the present disclosure.

Clicking on or selecting one of the listed users takes the administrator to a user overview screen 1800, as shown in FIG. 18, according to embodiments of the present disclosure. The user overview screen 1800 can include a portion 1802 displaying the user's personal information (e.g., a name, an email address, a gender, a date of birth, a date of last login, etc.), and a portion 1804 displaying a list of projects associated with the user (e.g., a list of essays the user has worked on, a list of applications for admissions the user has worked on, etc.).

If the menu "Manage Accounts" is selected, all active and inactive accounts can be shown in a portion 1902. The administrator can add a new account or make changes to an existing account (e.g., change active/inactive status, upload a logo, etc.).

If the menu "Essay Management" is selected, information of all essays stored in the interactive writing platform can be shown in a portion 2002. In some embodiments, the information of the essays can include an essay name, a creation date, a status (e.g., active, inactive, etc.). In some embodiments, the essay management portion 2002 can also include a dropdown button for the administrator to choose to edit or delete the selected essay.

Figure 21:
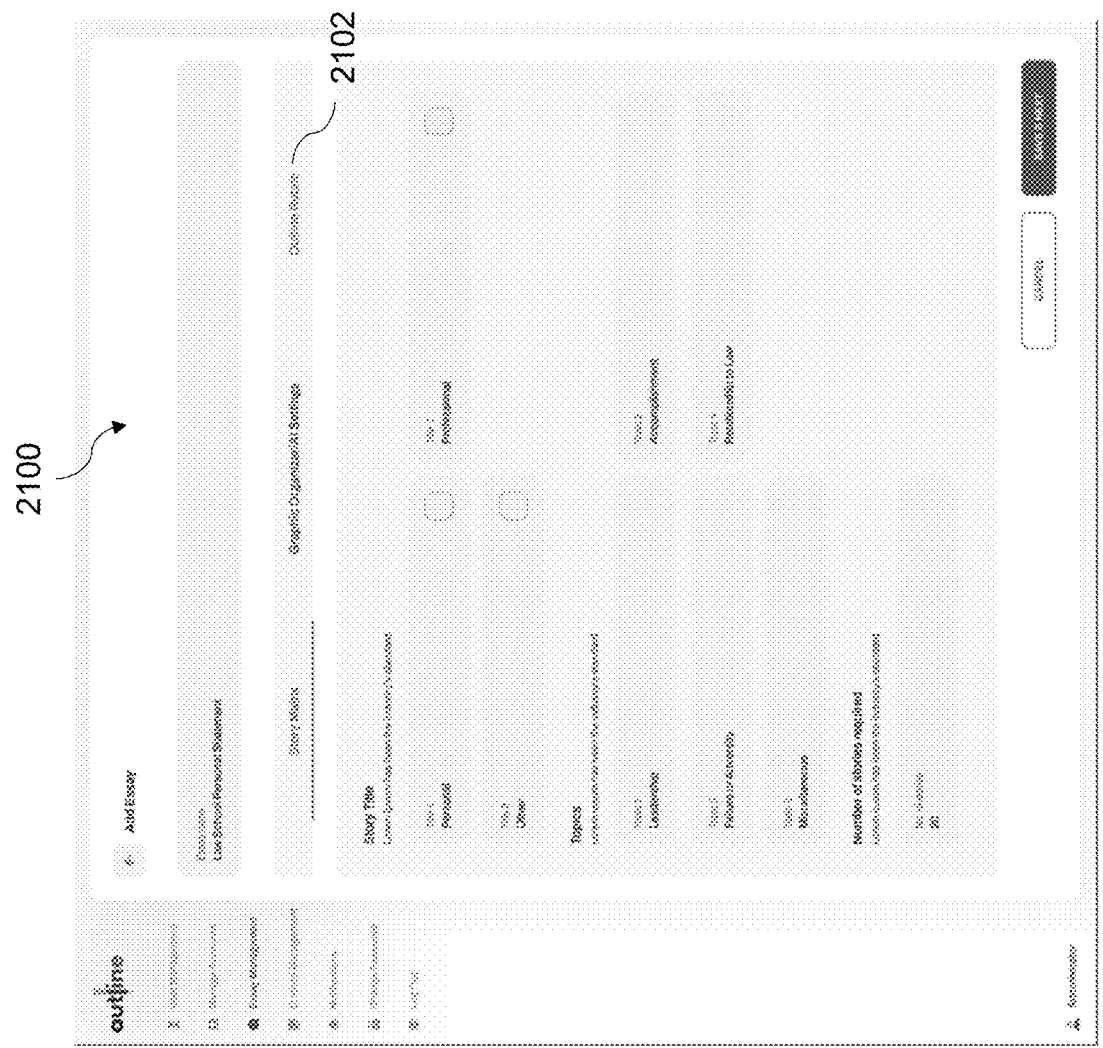
FIG. 21 illustrates an exemplary user interface for creating a new essay in an exemplary interactive writing platform according to certain embodiments of the present disclosure.

Clicking on or selecting an add essay link 2004 takes the administrator to a new essay screen, e.g., exemplary new essay screen 2100, as shown in FIG. 21, according to embodiments of present disclosure. The administrator can configure details of the new essay, such as a title, a story title, a topic, a number of stories required, etc.

Figure 22:
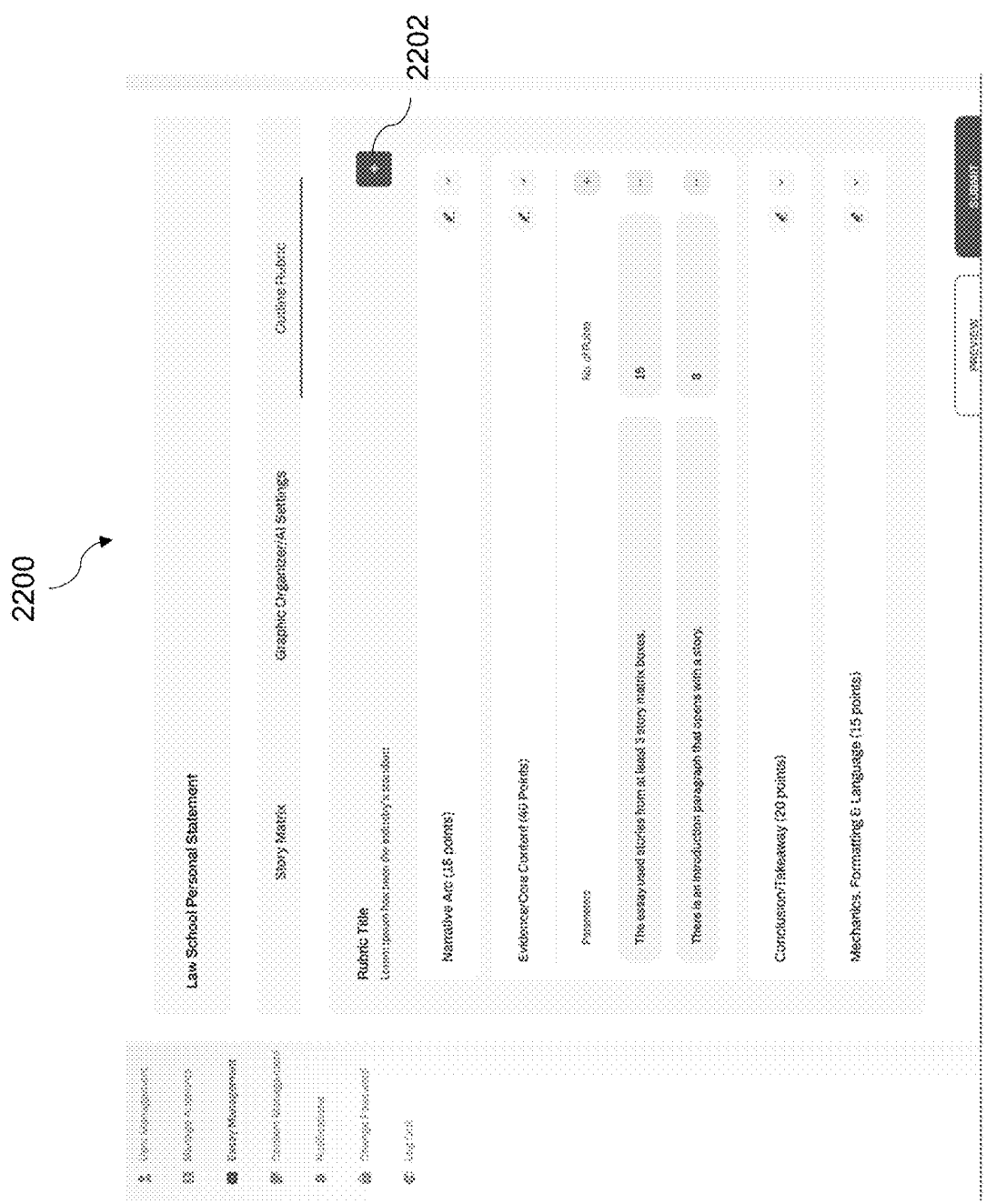
FIG. 22 illustrates an exemplary user interface depicting a rubric overview screen in an exemplary interactive writing platform according to certain embodiments of the present disclosure.

Clicking on or selecting an outline rubric link 2102 takes the administrator to a rubric overview screen, e.g., exemplary rubric overview screen 2200, as shown in FIG. 22, according to embodiments of the present disclosure. The rubric overview screen 2200 can display a list of criterion categories and specific criteria under each criterion category. The administrator can make edits to the specific criteria, such as, changing the content of the specific criterion or corresponding points, adding or removing specific criteria, etc.

Figure 23:
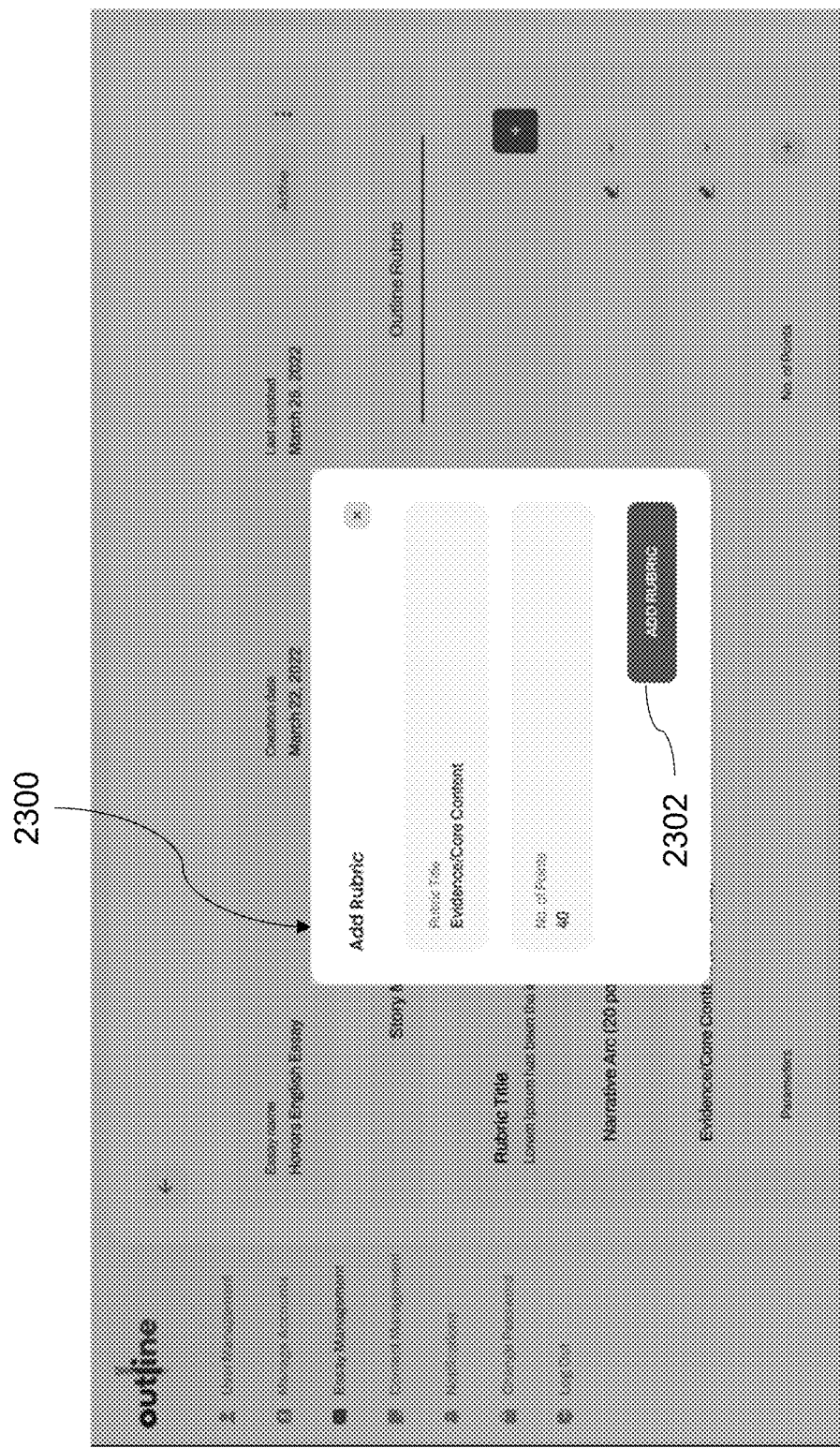
FIG. 23 illustrates an exemplary user interface for adding a rubric in an exemplary interactive writing platform according to certain embodiments of the present disclosure.

Clicking on or selecting an add new rubric link 2202 takes the administrator to a new rubric screen, e.g., exemplary new rubric screen 2300, as shown in FIG. 23, according to embodiments of the present disclosure. The administrator can enter a title for the new rubric and corresponding points or rewards. Clicking on or selecting the add rubric link 2302 takes the administrator back to the rubric overview screen 2200 in which the newly added rubric would appear in the list.

Various modifications and additions can be made to the exemplary embodiments discussed without departing from the scope of the present disclosure. For example, while the embodiments described above refer to particular features, the scope of the present disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

The invention claimed is:

1. A computer-implemented method, comprising:
receiving from a user, by at least one processor, inputs of an essay comprising a plurality of main points;
receiving from the user, by the at least one processor, a sequence of the plurality of main points;
arranging, by the at least one processor, the plurality of main points according to the received sequence;
receiving from the user, by the at least one processor, a plurality of details corresponding to one or more of the plurality of main points;
receiving from the user, by the at least one processor, a selection of a word from the essay;
providing, by the at least one processor, one or more suggested words corresponding to the selected word;
displaying, by the at least one processor, a list of pre-determined criteria and corresponding reward;
receiving from the user, by the at least one processor, a selection comprising a portion of the essay;
determining, by the at least one processor, whether the selection corresponds to one or more of the list of pre-determined criteria;
providing, by the at least one processor, an indicator indicating to the user that one or more of the list of pre-determined criteria are met;
calculating, by the at least one processor, a total reward received by the user;
displaying, by the at least one processor, the total reward.

2. The method of claim 1, wherein the indicator is a visual indicator.

3. The method of claim 1, wherein the list of pre-determined criteria is retrieved from a database.

4. The method of claim 1, wherein the list of pre-determined criteria is received from the user.

5. The method of claim 1, wherein the list of pre-determined criteria is received from an administrator.

6. The method of claim 1, wherein the list of pre-determined criteria corresponds to a class essay, a blog post, an email, or a personal statement.

7. The method of claim 1, further comprising a submit link, wherein the submit link is inactive unless the total reward received by the user is greater than a pre-determined threshold.

8. An interactive writing system, comprising:
at least one processor, and
t least one memory configured to store instructions, wherein the instructions, when executed, cause the at least one processor to:
receive from a user, inputs of an essay comprising a plurality of main points;
receive from the user, a sequence of the plurality of main points;
arrange the plurality of main points according to the received sequence;
receive from the user, a plurality of details corresponding to one or more of the plurality of main points;
receive from the user, a selection of a word from the essay;
provide one or more suggested words corresponding to the selected word;
display a list of pre-determined criteria and corresponding reward;
receive from the user, a selection comprising a portion of the essay;
determine whether the selection corresponds to one or more of the list of pre-determined criteria;
provide an indicator indicating to the user that one or more of the list of pre-determined criteria are met;
calculate a total reward received by the user; and
display the total reward.

9. The interactive writing system of claim 8, wherein the indicator is a visual indicator.

10. The interactive writing system of claim 8, wherein the list of pre-determined criteria corresponds to a class essay, a blog post, an email, or a personal statement.

11. The interactive writing system of claim 8, wherein the list of pre-determined criteria is retrieved from a database.

12. The interactive writing system of claim 8, wherein the list of pre-determined criteria is received from the user.

13. The interactive writing system of claim 8, wherein list of pre-determined criteria is received from an administrator.

14. The interactive writing system of claim 8, further comprising a submit link, wherein the submit link is inactive unless the total reward received by the user is greater than a pre-determined threshold.

15. One or more non-transitory computer-readable media storing instructions that, when executed by a processor, cause one or more computing devices to:
display a user interface on a screen of the one or more computing devices;
receive an essay comprising a plurality of main points;
receive a sequence of the plurality of main points;
arrange the plurality of main points according to the received sequence;
receive a plurality of details corresponding to the one or more of the plurality of main points;
receive a selection of a word from the essay;
provide, via the user interface, one or more suggested words corresponding to the selected word;
provide, via the user interface, a list of pre-determined criteria and corresponding reward;
receive an input comprising a selection of a portion of the essay;
determine whether the selection corresponds to one or more of the list of pre-determined criteria;
provide, via the user interface, an indicator indicating to the user that one or more of the list of pre-determined criteria are met;
calculate a total reward received by the user; and
display the total reward received by the user.

16. The non-transitory computer-readable media of claim 15, wherein the list of pre-determined criteria corresponds to a class essay, a blog post, an email, or a personal statement.

17. The non-transitory computer-readable media of claim 15, wherein the instructions further cause the at least one processor to provide one or more suggested transition words.

18. The non-transitory computer-readable media of claim 15, wherein the list of pre-determined criteria is retrieved from a database.

19. The non-transitory computer-readable media of claim 15, wherein the list of pre-determined criteria is received from the user.

20. The non-transitory computer-readable media of claim 15, further comprising a submit link, wherein the submit link is inactive unless the total reward received by the user is greater than a pre-determined threshold.

\* \* \* \* \*